United States Patent [19]

Rätz et al.

[11] 4,088,047
[45] May 9, 1978

[54] METHOD OF PRODUCING CUTTING TEETH FOR A CHAIN SAW

[75] Inventors: Adolf Rätz, Korb; Adolf Wilhelm, Backnang-Steinbach; Gerhard Odenwald, Waiblingen; Siegfried Frank, Remshalden-Buoch; Walter Stark, Unterweissach, all of Germany

[73] Assignee: Andreas Stihl Maschinenfabrik, Neustadt, Germany

[21] Appl. No.: 705,555

[22] Filed: Jul. 15, 1976

[30] Foreign Application Priority Data

Jul. 19, 1975 Germany .............................. 2532404

[51] Int. Cl.² .............................................. B23D 63/00
[52] U.S. Cl. .............................. 76/112; 113/116 AA; 72/181
[58] Field of Search .................... 72/181, 342; 76/112; 113/116 F, 116 HA, 116 AA

[56] References Cited

U.S. PATENT DOCUMENTS

| 108,990 | 11/1870 | Emerson | 76/112 |
| 226,426 | 4/1880 | Spaulding | 76/112 |
| 1,584,378 | 5/1926 | Jones | 72/181 |
| 3,696,692 | 10/1972 | Baranowski | 76/112 |

Primary Examiner—Harold D. Whitehead
Assistant Examiner—Roscoe V. Parker
Attorney, Agent, or Firm—Walter Becker

[57] ABSTRACT

A method of producing cutting teeth for a chain saw each of which has a tooth roof and a base body cranked relative to the tooth roof along a substantially sharp edge. The method includes using as starting material a flat band which at least on one flat side of the flat band has a ridge-shaped projection extending in the longitudinal direction of the flat band. The method further includes cutting the band transverse to its longitudinal axis into sections so that each section has an overall size just sufficient for the formation of a cutting tooth to be formed, while the ridge-shaped projection divides each section into a shorter end portion and a longer end portion. The shorter end portion is bent to form the tooth roof, and the longer end portion is provided with a crank relative to the tooth roof.

12 Claims, 7 Drawing Figures

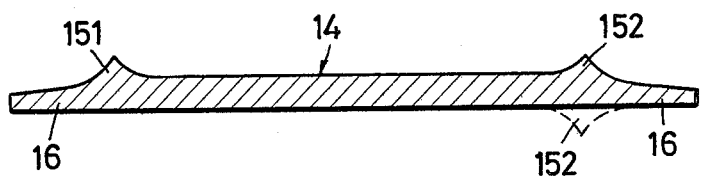
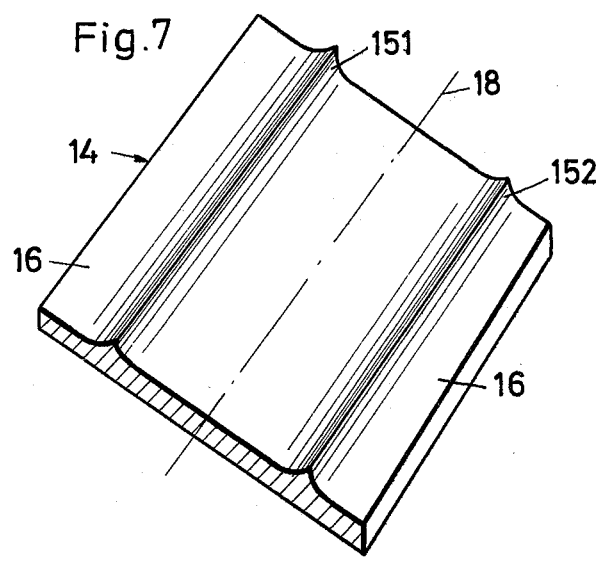

METHOD OF PRODUCING CUTTING TEETH FOR A CHAIN SAW

The present invention relates to a method of making cutting teeth for a chain saw which includes a tooth roof that is preferably in the form of a sharp edge cranked relative to a tooth base body. A method of producing cutting teeth of this type has become known from the German Offenlegungsschrift No. 2,220,555.

When producing cutting teeth for chain saws, it is desirable to provide with a sharp edge the merging area which is located between the tooth base body and the tooth roof and which is substantially bent at a right angle, in order to realize as high a cutting output as possible and also to obtain a chisel effect by the tooth. According to the customary cold deformation of the sheet-shaped flat finite starting raw piece, not only structurally expensive and complicated bending and offsetting tools are required, but it is also difficult process-wise such chisel teeth, at the merging area from the tooth base body to the tooth roof to design the sharp-edge merging area. This is due to the fact that during the upsetting and bending of the merging area toward the tooth roof region of the blade or plate-shaped raw piece automatically a more or less round bending edge is formed.

According to previous manufacturing processes it was, therefore, necessary following the bending and upsetting operation to post-machine by grinding the round bending edge, in order to obtain a sharp cutting tip. This, however, entails considerable additional costs.

The above mentioned method according to German Offenlegungsschrift No. 2,220,555, therefore, suggests that the plate-shaped raw metal piece employed as starting material be first increased in thickness by ribs by means of an upsetting operation and subsequently to so bend the thus machined metallic raw piece that the material of the rib-shaped increased thickness will be located within the region of the bending edge. While this upsetting is intended to avoid the necessity of a post-machining of the cutting tooth by grinding, experience has shown that also with this method the teeth have, following the bending operation, to be post-machined, especially post-ground. However, in view of the displacement of material, overlapping and the formation of tears in the texture of the material is unavoidable with the result that a premature wear of the saw teeth occurs which may even bring about a breakage of the saw teeth. Furthermore, the high mechanical forces required for the upsetting of the individual raw piece requires machines which complicate the structure and increase the manufacturing costs.

It is, therefore, an object of the present invention to provide a method of the above mentioned general type which will make it possible to produce cutting teeth of the type involved with a sharp cutting edge without the necessity of upsetting the starting raw piece or carrying out a post-grinding operation.

This object and other objects and advantages of the invention will appear more clearly from the following specification in connection with the accompanying drawings, in which:

FIG. 6 represents a cross section through a further embodiment of a band serving as starting material for the method according to the invention.

FIG. 7 is an isometric partial view of a band according to FIG. 3.

Figure 1:
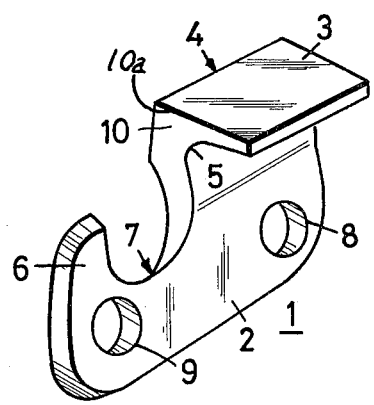
FIG. 1 is an isometric view of a cutting tooth for a saw chain produced in conformity with the method of the invention.

The method according to the present invention is characterized primarily in that as starting material there is employed a flat band which comprises at least one pre-formed extension which projects at least from a flat side of the flat band and extends in the longitudinal direction of the band. Said band is transverse to its longitudinal direction cut into pieces having the length of the finished cutting tooth, and along the said extension is bent by an angle which corresponds to the crank between the tooth roof and the tooth base body.

Due to the employment according to the invention of a flat band provided with at least one pre-formed extension as starting material for the manufacture of the cutting teeth, it is merely necessary after the cutting to length of the cutting tooth sections, in other words of band sections having the length of the finished cutting tooth, to bend that part of the flat band which forms the tooth roof, within the region of said extension so that the upper edge of the extension which is preferably designed with a triangular cross section, forms the sharp cutting edge of the saw tooth. Due to forming the above mentioned extension already during the manufacture of the flat band, the displacements in the microstructure of the raw workpiece occurring during upsetting operations of the individual raw pieces, and also the danger of forming microscopic fine tears in the texture of the material will be completely avoided. The uniform structure of the texture realized in the material during the rolling of the band, and also the granular size, especially within the region of the extension will be retained as it prevails after the final annealing of the for instance cold rolled flat band. In addition to a considerably more economical manufacture being achieved, moreover also a considerable improvement in the quality of the cutting tooth will be realized. Due to the simple manufacture, the method according to the invention is particularly suitable for mass fabrication because only cutting off and bending operations are necessary during the cutting tooth manufacture and because the band form of the starting material and the deformation of the extension are inexpensive in manufacture and in further machining same.

A particularly economical manufacturing possibility is realized when the flat band is provided with two pre-formed extensions extending as an image or point symmetrically with regard to the longitudinal axis of the band, which band is prior to or after the bending cut in the longitudinal direction into two raw cutting teeth. In view of the arrangement as image or the point symmetrical arrangement of two extension pieces with regard to the longitudinal axis of the band at both sides of the longitudinal axis of the band, it is possible with one cutting operation to provide twice the number of cutting teeth.

Prior to or after cutting off of the individual raw workpieces from the band, it is merely necessary to separate the sections along the longitudinal axis.

Whenever a tapering of the cross section of the tooth roof is desired, the features of the method according to the invention as set forth in the preceding paragraph yield the particular advantage that a post-treatment of the tooth roof by squeezing or rolling or the like for obtaining such cross sectional tapering is no longer necessary. A further advantage of the method according to the invention consists in that due to the elimination of an upsetting process, the necessary machines for carrying out the method of the present invention is greatly simplified inasmuch as merely simple presses, preferably eccentric presses are necessary.

Referring now to the drawings in detail, the cutting tooth 1 comprises a tooth base body 2 and a tooth roof 3 which is bent off with regard to the tooth base body 2 by a substantially right angle. The transgression region or merging region 10 between the lateral edge and the tooth base body 2 and the tooth roof 3 is thickened and its outer surface has a sharp bending edge 4 while at its inner surface the bending edge 5 is rounded. The point-shaped merging or transgression at the sharp bending edge 4 forms the cutting tip of the cutting tooth 1 at the merging area between the lateral cutting edge and the roof edge, said cutting tip of the cutting tooth 1 being located in front when considering the cutting direction. The tooth base body 2 is longer than tooth roof 3 and at its projecting end section has a depth-limiting section 6 which is separated from that portion of the body 2 which carries the tooth roof 3, by a channel or fillet 7. Within the region of the ends of the tooth base body 2, there are provided bores 8 and 9 for receiving transverse bolts which connect the cutting tooth with other links such as lateral or intermediate links to provide the total structure of the saw chain. As will be evident from the cross section of the cutting tooth 1 according to FIG. 1, the tooth roof 3 tapers from the merging area 10 to the free end of the tooth roof 3 whereby a good cutting effect will be assured. Furthermore, also the right angle between the outer surfaces of the tooth roof 3 and the tooth base body 2 is clearly evident from FIG. 2. The tooth base body 2 is cranked in the illustrated manner while the outer foot section 11 of the tooth base body 2 is oriented substantially at a right angle to the tooth roof 3, whereas the neck section 12 provided between the foot section 11 and the merging area 10 defines an angle of from 30° to 60°, preferably of 45° with the outer surface of the tooth roof 3.

Figure 2:
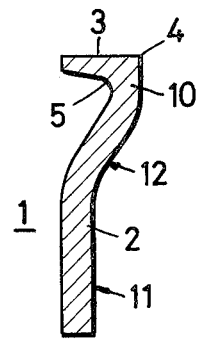
FIG. 2 is a cross section through the cutting tooth of FIG. 1.
Figure 3:
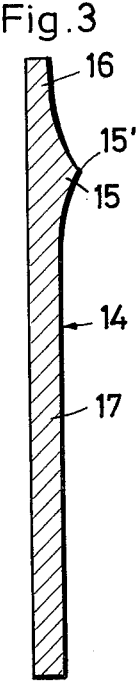
FIG. 3 represents a cross section through a band serving as starting material for the method according to the invention.
Figure 4:
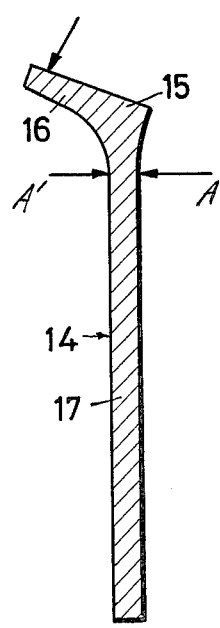
FIG. 4 illustrates a raw workpiece cut off to length of the band according to FIG. 3 when the forces act thereupon which forces are indicated by the arrows A, A'.
Figure 5:
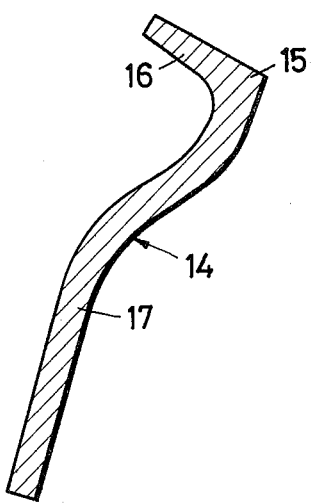
FIG. 5 shows the raw workpiece of FIG. 3 at the end of the bending operation.

For purposes of manufacturing the cutting tooth 1 illustrated in FIGS. 1 and 2, according to the invention a flat band 14 is employed which in conformity with FIG. 3 is provided with a pre-formed extension 15. The extension 15 is in the illustrated example provided with a triangular profile which, if desired, may be post-smoothened by the employment of pressure. After cutting off the individual bases from the band in conformity with the precise length of the finish cutting tooth, according to a further method step, the section 16 of the flat band 14 is bent relative to the section 17 (FIG. 4) while the bending and clamping forces to be employed are indicated in FIG. 4 by the arrows A, A'. The bending edge 4 with the finished cutting tooth 1 is formed by the profile edge 15 pre-formed in band 14 of the likewise formed extension 15. At the same time or subsequently to the bending of the band section 16, also the band section 17 is bent in an appropriate manner, in order to form the foot and neck sections 11 and 12 illustrated in FIG. 2. After the completion of the bending operations, the flat band section has the cross sectional shape which is illustrated in FIG. 5 and which corresponds to the cross sectional shape of tooth 1 illustrated in FIG. 2. The cutting tooth is, of course, punched in an appropriate manner for forming the channel or fillet 7 and the bores 8 and 9.

The band section 16 (FIG. 3) may also in an advantageous manner during the manufacture of the band be adapted to the tapering cross sectional shape of the tooth roof 3 so that a post-machining of the tooth roof 3 will not be necessary.

As will be evident from FIGS. 3–5, the deformation of the material of the flat band utilized according to the present invention is extremely slight so that a uniform course of the fibers will also be assured within the region of the cutting edge and that the overlapping of material and formation of tears as they occur during upsetting operations will be completely avoided. Due to the slight deformation of the material, a uniform grain size will be maintained in the material as it prevails after the final annealing of the for instance cold rolled flat band 16. Instead of a formed-on extension 15, also a plurality of extensions for instance 151 and 152 may be provided (FIG. 6) which extend parallel and image-like or point-symmetrically with regard to the longitudinal axis 18 (FIG. 7) of the flat band 14. The possibility of a point-symmetrical arrangement of the extensions 151 and 152 is indicated in FIG. 6 by dash lines.

The parts of the band located at both sides of the longitudinal axis 18 respectively correspond to the band illustrated in FIG. 3. After cutting to length of the individual sections which latter form the cutting tooth, the parts 14 are bent off in the same manner as already described, whereby the tooth will obtain its final shape. The thus formed cutting tooth base is cut open along the longitudinal axis 18 either prior or after the bending operations.

In addition to the above mentioned advantages, the method according to the invention also offers the possibility without technical or other expenses, in case of need precisely to adapt the tooth cross section as a whole, or specific sections of the tooth cross section, especially within the merging area between tooth roof and lateral section (lateral cutting edge) to the technical requirements, for instance by a local thickening or thinning of the cross section so that in a simple and economical manner it is possible to provide tooth profiles which are precisely adapted and defined in conformity with the various requirements. The width of the flat band corresponds substantially to the finished width of the raw cutting tooth. The thickness of the flat band corresponds substantially to the thickness of the raw cutting tooth.

It is, of course, to be understood that the present invention is, by no means, limited to the specific showing in the drawings, but also comprises any modifications within the scope of the appended claims.

What we claim is:

1. A method of making cutting teeth for a saw chain each of which has a base body and a tooth roof, and in which said base body is cranked along a substantially sharp edge relative to said tooth roof, said method including in combination the steps of: providing as starting material a flat band having two flat surfaces located opposite to each other with at least one of said flat surfaces having at least one ridge-shaped projection located closer to one longitudinal edge of said band than to the oppositely located longitudinal edge of said band and extending in the longitudinal direction of said band, cutting said band into sections transverse to the longitudinal axis of said band so that each section has an overall size just sufficient for the formation of a cutting tooth to be formed free of tears or cracks, the said at least one ridge section dividing the respective cut-off band section into a shorter end portion and a longer end portion, and essentially only once bending said shorter end portion uniformly in grain flow without overlapping longitudinally about the pertaining ridge portion so that the outer surface of said shorter end portion forms a desired angle with the adjacent portion of the pertaining longer end portion and represents the tooth roof.

2. A method in combination according to claim 1, in which said shorter end portion is bent so that the outer surface of said shorter end portion forms a substantially right angle with the adjacent portion of the pertaining longer end portion.

3. A method in combination according to claim 1, which includes the step of simultaneously with the bending of said shorter end portion providing a crank in said longer end portion.

4. A method in combination according to claim 1, which includes the step of subsequent to the bending of said shorter end portion about the pertaining ridge portion providing a crank in said longer end portion.

5. A method in combination according to claim 1, which includes the step of providing said longer end portion with a crank forming an angle of from 30° to 60° with the outer end face formed by said bent shorter end portion.

6. A method in combination according to claim 1, in which the width of said flat band corresponds substantially to the finished width of the raw cutting tooth.

7. A method in combination according to claim 1, in which the thickness of said flat band corresponds substantially to the thickness of the raw cutting tooth.

8. A method in combination according to claim 1, in which said at least one ridge section has a substantially triangular cross section with a thickened portion between said tooth roof and said longer section.

9. A method in combination according to claim 1, in which one of said flat surfaces is provided with two ridge-shaped projections arranged in spaced relationship to each other and symmetrically with regard to the longitudinal axis of said flat band, and in which said band is cut into sections not only transverse to but also along said longitudinal axis.

10. A method in combination according to claim 1, in which said shorter end portion of said flat band provided as starting material tapers toward its outer edge.

11. A method in combination according to claim 10, in which the taper of said shorter end portion corresponds to the desired taper of the finished cutting tooth.

12. A method in combination according to claim 1 which includes the steps of punching a channel into said tooth base body adjacent the inner end face of said tooth roof to provide a depth-limiting element, and also punching holes in said base body for receiving transverse bolts pertaining to the chain saw to be made up of the cutting teeth.

* * * * *